United States Patent
Yasuda et al.

(10) Patent No.: US 10,344,362 B2
(45) Date of Patent: *Jul. 9, 2019

(54) STEEL MATERIAL FOR HIGHLY DEFORMABLE LINE PIPES HAVING SUPERIOR STRAIN AGING RESISTANCE AND SUPERIOR HIC RESISTANCE, METHOD FOR MANUFACTURING SAME, AND WELDED STEEL PIPE

(71) Applicant: JFE STEEL CORPORATION, Tokyo (JP)

(72) Inventors: Kyono Yasuda, Fukuyama (JP); Daisuke Mizuno, Kawasaki (JP); Haruo Nakamichi, Kawasaki (JP); Nobuyuki Ishikawa, Kawasaki (JP)

(73) Assignee: JFE STEEL CORPORATION, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 15/300,980

(22) PCT Filed: Mar. 26, 2015

(86) PCT No.: PCT/JP2015/001726
§ 371 (c)(1),
(2) Date: Sep. 30, 2016

(87) PCT Pub. No.: WO2015/151469
PCT Pub. Date: Oct. 8, 2015

(65) Prior Publication Data
US 2017/0022590 A1  Jan. 26, 2017

(30) Foreign Application Priority Data
Mar. 31, 2014  (JP) .................. 2014-070824

(51) Int. Cl.
| | | |
|---|---|---|
| *C22C 38/58* | (2006.01) | |
| *C21D 8/02* | (2006.01) | |
| *C22C 38/00* | (2006.01) | |
| *C22C 38/16* | (2006.01) | |
| *C21D 8/10* | (2006.01) | |
| *C21D 9/08* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/42* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |
| *B23K 31/02* | (2006.01) | |
| *C21D 9/46* | (2006.01) | |
| *F16L 9/02* | (2006.01) | |
| *F16L 9/17* | (2006.01) | |

(52) U.S. Cl.
CPC ............ *C22C 38/58* (2013.01); *B23K 31/027* (2013.01); *C21D 8/0226* (2013.01); *C21D 8/105* (2013.01); *C21D 9/08* (2013.01); *C21D 9/085* (2013.01); *C21D 9/46* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/42* (2013.01); *C22C 38/46* (2013.01); *C22C 38/48* (2013.01); *C22C 38/50* (2013.01); *C22C 38/54* (2013.01); *F16L 9/02* (2013.01); *F16L 9/17* (2013.01); *C21D 2211/002* (2013.01); *C21D 2211/005* (2013.01)

(58) Field of Classification Search
CPC ........ C21D 8/105; C21D 8/0226; C22C 38/58
See application file for complete search history.

(56) References Cited

U.S. PATENT DOCUMENTS

| | | |
|---|---|---|
| 7,520,943 B2 | 4/2009 | Ishikawa et al. |
| 8,778,096 B2 | 7/2014 | Shimamura et al. |
| (Continued) | | |

FOREIGN PATENT DOCUMENTS

| | | |
|---|---|---|
| CN | 102549189 A | 7/2012 |
| EP | 1 354 973 A1 | 10/2003 |
| (Continued) | | |

OTHER PUBLICATIONS

Mar. 21, 2017 Office Action issued in Japanese Patent Application No. 2016-511375.
Apr. 6, 2017 Office Action issued in Chinese Patent Application No. 201580017406.3.
Oct. 18, 2017 Office Action issued in Korean Patent Application No. 10-2016-7027218.
Aug. 21, 2017 Search Report issued in European Patent Application No. 15773521.8.
Nov. 15, 2017 Office Action issued in Chinese Patent Application No. 201580017406.3.
(Continued)

*Primary Examiner* — Scott R Kastler
(74) *Attorney, Agent, or Firm* — Oliff PLC

(57) ABSTRACT

A steel material for highly deformable line pipes that has superior strain aging resistance, superior HIC resistance, and a metallographic structure composed mainly of ferrite and bainite. The total area fraction of the ferrite and the bainite is 90% or more, and the difference in hardness between the ferrite and the bainite is 70 or more in terms of Vickers hardness. Additionally, the steel material has a uniform elongation of 9% or more and a yield ratio of 90% or less both before a strain aging treatment at a temperature of 300° C. or lower and after the strain aging treatment.

6 Claims, No Drawings

(56) References Cited

U.S. PATENT DOCUMENTS

| | | | |
|---|---|---|---|
| 8,926,766 B2 | 1/2015 | Shimamura et al. | |
| 9,932,651 B2* | 4/2018 | Ishiguro | C21D 9/085 |
| 2010/0119860 A1 | 5/2010 | Hitoshi et al. | |
| 2010/0330388 A1 | 12/2010 | Hara et al. | |
| 2012/0247625 A1 | 10/2012 | Shimamura et al. | |
| 2012/0285576 A1 | 11/2012 | Nishimura et al. | |
| 2012/0305122 A1 | 12/2012 | Ishikawa et al. | |
| 2013/0000793 A1 | 1/2013 | Ishikawa et al. | |
| 2015/0090370 A1 | 4/2015 | Shimamura et al. | |
| 2016/0053354 A1 | 2/2016 | Ohta et al. | |
| 2017/0022583 A1* | 1/2017 | Yasuda | C21D 8/0263 |
| 2017/0022590 A1* | 1/2017 | Yasuda | C21D 8/105 |
| 2018/0105893 A1* | 4/2018 | Ishitsuka | C21D 9/505 |

FOREIGN PATENT DOCUMENTS

| | | |
|---|---|---|
| EP | 1568792 A1 | 8/2005 |
| EP | 2 105 513 A1 | 9/2009 |
| EP | 2484792 A1 | 8/2012 |
| EP | 2 799 575 A1 | 11/2014 |
| EP | 2 832 889 A1 | 2/2015 |
| JP | S55-97425 A | 7/1980 |
| JP | S62-290847 A | 12/1987 |
| JP | H01-176027 A | 7/1989 |
| JP | H05-43766 B2 | 7/1993 |
| JP | H08-209241 A | 8/1996 |
| JP | 2003-301236 A | 10/2003 |
| JP | 2005-048224 A | 2/2005 |
| JP | 2005-060835 A | 3/2005 |
| JP | 2005-060839 A | 3/2005 |
| JP | 2005-060840 A | 3/2005 |
| JP | 2011-074443 A | 4/2011 |
| JP | 2012-017522 A | 1/2012 |
| JP | 2012/21214 A | 2/2012 |
| JP | 2012-241266 A | 12/2012 |
| JP | 2012-241271 A | 12/2012 |
| JP | 2013-133476 A | 7/2013 |
| RU | 2360013 C2 | 6/2009 |
| RU | 2 427 662 C2 | 8/2011 |
| RU | 2 427 663 C2 | 8/2011 |
| RU | 2 496 906 C2 | 10/2013 |
| WO | 2013/099192 A1 | 7/2013 |
| WO | 2013/145770 A1 | 10/2013 |

OTHER PUBLICATIONS

Oct. 17, 2017 Office Action issued in Russian Patent Application No. 2016138675/02(061608).
Jun. 30, 2015 International Search Report issued in Patent Application No. PCT/JP2015/001726.
Sep. 26, 2018 Office Action issued in U.S. Appl. No. 15/301,278.
Jul. 11, 2018 Office Action issued in European Patent Application No. 15 773 521.8.
May 2, 2019 Office Action issued in U.S. Appl. No. 15/301,278.
Mar. 7, 2019 Office Action issued in European Patent Application No. 15773521.8.

* cited by examiner

STEEL MATERIAL FOR HIGHLY DEFORMABLE LINE PIPES HAVING SUPERIOR STRAIN AGING RESISTANCE AND SUPERIOR HIC RESISTANCE, METHOD FOR MANUFACTURING SAME, AND WELDED STEEL PIPE

TECHNICAL FIELD

The present disclosure relates to a steel material for line pipes that shows less deterioration in material properties after coating treatment at 300° C. or lower, to a method for manufacturing the steel material, and to a welded steel pipe. Specifically, the present disclosure relates to an API 5L X60 to X70 grade steel material for line pipes that has superior HIC resistance in a wet hydrogen sulfide environment with a pH of 5 or more.

BACKGROUND ART

In recent years, there is a need for line pipes used for transporting natural gas and crude oil to have higher strength, in order to improve transport efficiency by high pressure operation. Specifically, the line pipes are required to have high deformability so that the occurrence of cracks can be prevented even when the line pipes are largely deformed by ice gouging or ground deformation. For example, in pipe lines constructed in seismic regions or on the seabed in cold climates where ice gouging occurs, line pipes with high uniform elongation and a low yield ratio of 90% or less are required.

Welded steel pipes such as UOE steel pipes and ERW steel pipes are used for line pipes. Such a welded steel pipe is manufactured by subjecting a steel plate/sheet to cold forming into a pipe shape, welding the seam, and then generally subjecting the outer surface of the steel pipe to coating treatment from the viewpoint of corrosion protection. However, a strain age hardening phenomenon occurs due to work strain imposed during the manufacturing of the pipe and heating during the coating treatment, and this causes an increase in yield stress, so that a problem arises in that the yield ratio of the steel pipe is larger than the yield ratio of the steel plate.

In line pipes used to transport natural gas and crude oil containing hydrogen sulfide, hydrogen generated by the reaction of the hydrogen sulfide and the steel enters the steel, and this may cause cracking. Therefore, such line pipes are required to have hydrogen-induced cracking resistance (HIC resistance) in addition to strength, high uniform elongation, low yield ratio, and strain aging resistance.

One known effective method for achieving a low yield ratio and high uniform elongation is to produce a steel material having a metallographic structure in which hard phases such as bainite and martensite are properly dispersed in a soft phase such as ferrite. One known effective method for preventing hydrogen-induced cracking is to reduce P etc. having a strong tendency to segregation. As gas fields are increasingly developed, a wide variety of sour environment (pH, hydrogen sulfide partial pressure) is increasing, and attention is given to a mildly sour environment (a wet hydrogen sulfide environment). In an environment having a relatively low acidity with a pH of 5 or more, i.e., a so-called mildly sour environment, it is known that addition of Cu to steel to form a protective coating on the steel material is effective in suppressing penetration of hydrogen into the steel.

Patent Literature 1 discloses a manufacturing method for obtaining a structure in which a hard phase is properly dispersed in a soft phase. This manufacturing method includes a heat treatment method in which quenching from a two-phase region of ferrite and austenite is performed between quenching and tempering.

Patent Literature 2 discloses a technique for achieving a low yield ratio without performing the complicated heat treatment disclosed in Patent Literature 1. In this method, rolling of a steel material is finished at a temperature equal to or higher than the $Ar_3$ temperature, and then the rate of accelerated cooling and cooling stop temperature are controlled to obtain a two-phase structure of acicular ferrite and martensite, whereby a low yield ratio is achieved.

As for the strain aging resistance, Patent Literatures 3 and 4, for example, disclose low-yield ratio, high-strength and high-toughness steel pipes having superior strain aging resistance and methods for manufacturing the steel pipes. Specifically, a fine precipitate of a composite carbide containing Ti and Mo or a fine precipitate of a composite carbide containing at least two of Ti, Nb, and V is utilized.

Patent Literature 5 discloses a method for achieving a low yield ratio, high strength, high uniform elongation, superior strain aging resistance, and API 5L X70 or lower without greatly increasing the amounts of alloy elements added to a steel material. In this method, reheating is performed immediately after accelerated cooling, and a three-phase structure including bainite, polygonal ferrite, and martensite-austenite constituent (MA) is thereby obtained.

Patent Literature 6 discloses a method for achieving HIC resistance in a steel material with API 5L X65 or higher and having a two-phase structure of ferrite and bainite. In this method, the difference in hardness between the ferrite and bainite is reduced.

CITATION LIST

Patent Literature

PTL 1: Japanese Unexamined Patent Application Publication No. 55-97425
PTL 2: Japanese Unexamined Patent Application Publication No. 1-176027
PTL 3: Japanese Unexamined Patent Application Publication No. 2005-60839
PTL 4: Japanese Unexamined Patent Application Publication No. 2005-60840
PTL 5: Japanese Unexamined Patent Application Publication No. 2011-74443
PTL 6: Japanese Unexamined Patent Application Publication No. 2003-301236

SUMMARY

Technical Problem

With the heat treatment method described in Patent Literature 1, a low yield ratio can be achieved by appropriately selecting the quenching temperature from the two-phase region. However, the number of heat treatment steps is large, and this leads to a problem in that productivity decreases and the cost of manufacturing increases.

In the technique described in Patent Literature 2, it is necessary that, in order to obtain a steel material with a tensile strength of 490 $N/mm^2$ (50 $kg/mm^2$) or more, the content of carbon in the steel material be increased or a chemical composition including increased amounts of other alloy elements added be used, as shown in Examples in Patent Literature 2. This causes an increase in the cost of raw materials and also results in a problem of deterioration of the toughness of a weld heat affected zone. As described above, a welded steel pipe such as a UOE steel pipe or an ERW steel pipe is produced by subjecting a steel plate/sheet to cold forming into a pipe shape, welding the seam, and then generally subjecting the outer surface of the steel pipe to coating treatment from the viewpoint of corrosion protection etc. Therefore, strain age hardening occurs due to work strain imposed during the manufacturing of the pipe and heating during the coating treatment, and this causes an increase in yield stress. With the technique in Patent Literature 2, although the yield ratio of the raw material steel plate/sheet is reduced, it is difficult to achieve a low yield ratio after the coating treatment.

With the technique described in Patent Literature 3 or 4, the strain aging resistance is improved. However, as shown in Examples in Patent Literatures 3 and 4, no studies were made to ensure the strength of a plate having a large thickness of 26 mm or more. It is difficult to increase the strength of a plate having a large thickness of 26 mm or more because of a reduction in cooling rate due to the large thickness. A multi-specification material of API 5L X65 to X70 having a large thickness, high deformability, strain aging resistance, and mild-sour resistance has not been developed.

With the technique described in Patent Literature 5, a low yield ratio of 85% or less is achieved after strain aging treatment, as shown in Examples in Patent Literature 5. However, it is feared that hydrogen-induced cracking will occur in a wet hydrogen sulfide environment.

With the technique described in Patent Literature 6, high HIC resistance is achieved in a wet hydrogen sulfide environment with a pH of 3.3 or higher. However, since it is necessary to reduce the difference in hardness between the ferrite and bainite, a low yield ratio may not be achieved. Material design for steel used in a severe sour environment, such as high cleanliness of steel components, is excessive for welded steel pipes used under a mildly sour environment and causes a problem of an increase in manufacturing cost.

It is an object of the present disclosure to provide an API 5L X60 to X70 grade steel material for highly deformable line pipes that exhibits superior HIC resistance in a wet hydrogen sulfide environment with a pH of 5 or more and has a low yield ratio even after coating treatment at 300° C. or lower and to provide a method for manufacturing the steel material and a welded steel pipe.

Solution to Problem

To achieve the foregoing object, the present inventors have conducted extensive studies on an appropriate chemical composition and a method for manufacturing a steel material, particularly on a manufacturing process including controlled rolling and accelerated cooling after the controlled rolling, and have found the following.

(a) The HIC resistance can be improved by adding an appropriate amount of Cu while no Mo is contained or, even when No is contained, its content is 0.01% or less.

(b) By setting accelerated cooling start temperature and accelerated cooling stop temperature to appropriate temperatures, the metallographic structure of the steel plate becomes a two-phase structure including ferrite and bainite or a structure composed mainly of the two-phase structure, and the difference in hardness between the ferrite and the bainite becomes 70 or more in terms of Vickers hardness.

This allows a low yield ratio to be achieved both before strain aging treatment and after the strain aging treatment (hereinafter may be referred to as both before and after the strain aging treatment).

(c) By setting the cooling start temperature and the cooling stop temperature during the accelerated cooling to appropriate temperatures, the amount of solute C can be reduced, so that an increase in the yield ratio after strain aging treatment can be suppressed.

The disclosed embodiments have been made on the basis of the above findings and further studies and is as follows.

[1] A steel material for highly deformable line pipes that has superior strain aging resistance and superior HIC resistance, the steel material having a chemical composition comprising, in mass %, C: 0.030 to 0.100%, Si: 0.01 to 0.50%, Mn: 0.5 to 2.5%, P: 0.015% or less, S: 0.002% or less, Cu: 0.20 to 1.00%, Mo: 0.01% or less, Nb; 0.005 to 0.05%, Ti; 0.005 to 0.040%, Al: 0.10% or less, and N: 0.007% or less, with the balance being Fe and inevitable impurities, wherein the steel material has a metallographic structure composed mainly of ferrite and bainite, wherein the total area fraction of the ferrite and the bainite is 90% or more, wherein the difference in hardness between the ferrite and the bainite is 70 or more in terms of Vickers hardness, and wherein, both before strain aging treatment at a temperature of 300° C. or lower and after the strain aging treatment, the steel material has a uniform elongation of 9% or more and a yield ratio of 90% or less.

[2] The steel material for highly deformable line pipes that has superior strain aging resistance and superior HIC resistance according to [1], wherein the chemical composition further comprises, in mass %, one or at least two selected from Ni: 0.02 to 0.50%, Cr: 1.00% or less, V: 0.10% or less, Ca: 0.0050% or less, and B: 0.0050% or less.

[3] A method for manufacturing a steel material for highly deformable line pipes that has superior strain aging resistance and superior HIC resistance, the method comprising: heating steel having the chemical composition according to [1] or [2] to a temperature of 1,000 to 1,300° C.; subjecting the resulting steel to hot rolling at a finish rolling temperature equal to or higher than $Ar_3$ temperature; and then subjecting the resulting steel to accelerated cooling from a temperature of $(Ar_3-50)$ to $(Ar_3+30)°$ C. to a cooling stop temperature of 500 to 650° C. at a cooling rate of 5° C./s or more; wherein the steel material has a metallographic structure composed mainly of ferrite and bainite, wherein the total area fraction of the ferrite and the bainite is 90% or more, wherein the difference in hardness between the ferrite and the bainite is 70 or more in terms of Vickers hardness, and wherein, both before strain aging treatment at a temperature of 300° C. or lower and after the strain aging treatment, the steel material has a uniform elongation of 9% or more and a yield ratio of 90% or less.

[4] A welded steel pipe produced using, as a raw material, the steel material for highly deformable line pipes that has superior strain aging resistance and superior HIC resistance according to [1] or [2].

Advantageous Effects

According to the present disclosure, an API 5L X60 to X70 grade steel material for highly deformable line pipes can be obtained, which exhibits superior HIC resistance in a wet hydrogen sulfide environment with a pH of 5 or more and has a low yield ratio even after coating treatment at 300° C. or lower.

The strain aging resistance in the present disclosure is a property that allows an excessive increase in yield ratio to be suppressed even when heat treatment at a temperature of 300° C. or lower is performed. The HIC resistance in the present disclosure is such a property that hydrogen-induced cracking is prevented from occurring in a wet hydrogen sulfide environment with a pH of 5 or more. The high deformability is such a property that the uniform elongation is 9% or more and the yield ratio is 90% or less.

DESCRIPTION OF EXEMPLARY EMBODIMENTS

The disclosed exemplary embodiments will next be specifically described.

1. Chemical Composition

A description will next be given of the reasons for the limitations on the chemical composition of the steel material according to the disclosed embodiments. The unit "%" for each component means % by mass.

C: 0.030 to 0.100%

C is an element that contributes to precipitation strengthening in the form of carbide. If C is less than 0.030%, sufficient strength cannot be ensured. If C exceeds 0.100%, toughness and weldability deteriorate, and strain aging causes an increase in the yield ratio. Therefore, the content of C is specified to be 0.030 to 0.100%. Preferably, the content of C is 0.05% or more. Preferably, the content of C is 0.09% or less.

Si: 0.01 to 0.50%

Si is added for the purpose of deoxidization. If Si is less than 0.01%, the deoxidization effect is insufficient. If Si exceeds 0.50%, the toughness and weldability deteriorate. Therefore, the content of Si is specified to be 0.01 to 0.50%. More preferably, the content of Si is 0.01 to 0.3%.

Mn: 0.5 to 2.5%

Mn is added for the purpose of strength and toughness. If Mn is less than 0.5%, its effect is insufficient. Therefore, the content of Mn is 0.5% or more. From the viewpoint of achieving a low yield ratio through the formation of MA, the content of Mn is preferably 1.2% or more and more preferably 1.5% or more. If Mn exceeds 2.5%, the toughness and weldability deteriorate. Therefore, the upper content of Mn is specified to be 2.5% or less and is preferably 2.2% or less.

P: 0.015% or Less

P is an inevitable impurity element that causes deterioration of the weldability and HIC resistance. Therefore, the content of P is specified to be 0.015% or less. More preferably, the content of P is 0.010% or less.

S: 0.002% or Less

Generally, S forms MnS inclusions in the steel, and this causes deterioration of the HIC resistance. Therefore, the content of S is preferably as small as possible. When S is 0.002% or less, S causes no problems. Therefore, the upper limit of the content of S is specified to be 0.002%. More preferably, the content of S is 0.0015% or less.

Cu: 0.20 to 1.00%

Cu is an important element in the present disclosure. Cu suppresses penetration of hydrogen into the steel and contributes to an improvement of the HIC resistance. However, if Cu is less than 0.20%, its effect is insufficient. If Cu exceeds 1.00%, the weldability deteriorates. Therefore, the content of Cu is specified to be 0.20 to 1.00%. Preferably, the content of Cu is 0.25% or more. Preferably, the content of Cu is 0.5% or less.

Mo: 0.01% or Less (Including 0)

Mo causes an increase in yield ratio by strain aging and deterioration of the HIC resistance. Therefore, no Mo is contained, or, even when Mo is contained, the content of Mo is specified to be 0.01% or less. More preferably, Mo is 0.005% or less.

Nb: 0.005 to 0.05%

Nb improves the toughness through refinement of the structure and forms carbide to thereby contribute to an increase in strength. However, if Nb is less than 0.005%, its effect is insufficient. If Nb exceeds 0.05%, the toughness of a weld heat affected zone deteriorates. Therefore, the content of Nb is specified to be 0.005 to 0.05%. Preferably, the content of Nb is 0.01% or more. Preferably, the content of Nb is 0.05% or less.

Ti: 0.005 to 0.040%

Ti suppresses coarsening of austenite during heating of a slab through the pinning effect of TiN, improves the toughness of the base material, reduces the amount of solute N, and suppresses an increase in yield ratio by strain aging. However, if Ti is less than 0.005%, its effect is insufficient. If Ti exceeds 0.040%, the toughness of a weld heat affected zone deteriorates. Therefore, the content of Ti is specified to be 0.005 to 0.040%. More preferably, Ti is 0.005 to 0.02%.

Al: 0.10% or Less

Al is added as a deoxidizer. If Al exceeds 0.10%, the cleanliness of the steel is reduced, and the toughness deteriorates. Therefore, the content of Al is specified to be 0.10% or less. Preferably, the content of Al is 0.08% or less. Preferably, the content of Al is 0.01% or more.

N: 0.007% or Less

N is an inevitable impurity element that causes an increase in yield ratio by strain aging and deterioration of the toughness of a weld heat affected zone. Therefore, the upper limit of the content of N is specified to be 0.007%. More preferably, N is 0.006% or less.

The above-described components are basic components of the present disclosure. For the purpose of further improving the strength and toughness of the steel material and also increasing its HIC resistance, one or at least two of Ni, Cr, V, Ca, and B may be contained.

Ni: 0.02 to 0.50%

Ni is an element that contributes to an improvement of the HIC resistance and is effective in improving the toughness and increasing the strength. If Ni is less than 0.02%, its effect is insufficient. If Ni exceeds 0.50%, its effect is saturated, and this is disadvantageous in terms of cost. Therefore, when Ni is contained, the content of Ni is specified to be 0.02 to 0.50%. Preferably, the content of Ni is 0.20% or more. Preferably, the content of Ni is 0.4% or less.

Cr: 1.00% or Less

Cr is an element effective in obtaining sufficient strength even at low C content. If Cr exceeds 1.00%, the weldability deteriorates. Therefore, when Cr is contained, the upper limit of the content of Cr is specified to be 1.00%. Preferably, the content of Cr is 0.5% or less. Preferably, the content of Cr is 0.1% or more.

V: 0.10% or Less

V improves the toughness through refinement of the structure and forms carbide to thereby contribute to an increase in strength. If V exceeds 0.10%, the toughness of a weld heat affected zone deteriorates. Therefore, when V is contained, the content of V is specified to be 0.10% or less. Preferably, the content of V is 0.05% or less. Preferably, the content of V is 0.005% or more.

Ca: 0.0050% or Less

Ca is an element effective in improving the toughness through control of the form of sulfide-based inclusions. If Ca exceeds 0.0050%, its effect is saturated, and the toughness rather deteriorates because of a reduction in the cleanliness of the steel. Therefore, when Ca is contained, the content of Ca is specified to be 0.0050% or less. Preferably, the content of Ca is 0.004% or less. Preferably, the content of Ca is 0.001% or more.

B: 0.0050% or Less

B is an element effective in increasing the strength and improving the toughness of a weld heat affected zone. If B exceeds 0.0050%, the weldability deteriorates. Therefore, when B is contained, the content of B is specified to be 0.0050% or less. More preferably, the content of B is 0.003% or less. Preferably, the content of B is 0.0003% or more.

In the steel material of the disclosed embodiments, the balance other than the above-described components is Fe and inevitable impurities. However, elements other than above-described elements may be contained without any problems, so long as the operational advantages of the present disclosure are not impaired.

2. Metallographic Structure

The metallographic structure of the steel plate of the present disclosure is a multi-phase structure composed mainly of ferrite and bainite. The multi-phase structure composed mainly of ferrite and bainite is a multi-phase structure in which the total area fraction of the ferrite and the bainite is 90% or more. The remainder is a structure including one or at least two selected from martensite, pearlite, martensite-austenite constituent, retained austenite, etc. and having a total area fraction of 10% or less.

No particular limitation is imposed on the area fractions of the ferrite and the bainite. If the area fraction of the ferrite is less than 10%, bainite with a high hardness may not be obtained. Therefore, from the viewpoint of increasing the difference in hardness between the ferrite and the bainite to thereby achieve a low yield ratio, the area fraction of the ferrite is preferably 10% or more. If the area fraction of the ferrite exceeds 50%, a reduction in strength may occur. Therefore, from the viewpoint of ensuring strength, the area fraction of the ferrite is preferably 50% or less. From the viewpoint of ensuring a low yield ratio and strength, the area fraction of the bainite is preferably 10% or more.

The difference in hardness between the ferrite and bainite is 70 or more in terms of Vickers hardness (HV). When the difference in hardness is 70 or more, the yield ratio can be 90% or less both before and after the strain age hardening treatment. From the viewpoint of a low yield ratio, the difference in hardness is preferably 75 HV or more. A difference in hardness of less than 70 HV results in the same behavior as that of a ferrite or bainite single phase structure, and the yield ratio becomes high, so that it is difficult to achieve the desired yield ratio. If the difference in hardness between the ferrite and bainite is more than 180 HV, the HIC resistance may deteriorate, and the yield ratio after the strain aging may increase. Therefore, the difference in hardness is preferably 180 HV or less and is more preferably 150 HV or less.

The types of the metallographic structures and the area fraction of each phase can be determined by observation under, for example, an optical microscope or a scanning electron microscope. Specifically, microstructure photographs of at least three regions are taken and subjected to image processing.

The hardness is a value measured using a Vickers hardness tester, and any load can be selected so that an indentation with an optimal size is obtained inside each phase. Preferably, the same load is used to measure the hardness of the ferrite and the hardness of the bainite. In consideration of local variations in the composition of the microstructure and variations due to measurement errors, it is preferable that the hardness measurement is performed at at least 15 different positions for each structure and that the average hardnesses of these structures are used as the hardnesses of the ferrite and bainite. The difference in hardness when the average hardnesses are used is the absolute value of the difference between the average hardness of the ferrite and the average hardness of the bainite.

3. Tensile Properties before and after Strain Aging Treatment

Both before strain aging treatment at a temperature of 300° C. or lower and after the strain aging treatment, the uniform elongation is 9% or more, and the yield ratio is 90% or less.

A steel material for line pipes used in seismic regions is required to be highly deformable so that no fracture occurs even under large deformation such as ground deformation. In addition, it is necessary that the high deformability be maintained even after the strain aging treatment in which the steel material is heated up to 300° C. for coating the steel material for corrosion protection. When, both before the strain aging treatment at a temperature of 300° C. or lower and after the strain aging treatment, the uniform elongation is 9% or more and the yield ratio is 90% or less, sufficiently high deformability is obtained, so that fracture may not occur due to large deformation such as an earthquake. It is preferable that, both before the strain aging treatment at a temperature of 300° C. or lower and after the strain aging treatment, the uniform elongation is 10% or more and the yield ratio is 88% or less, from the viewpoint of high deformability.

4. Manufacturing Conditions

The desired metallographic structure can be obtained by: subjecting a steel raw material having the above-described chemical composition to hot rolling at a heating temperature of 1,000 to 1,300° C. and a finish rolling temperature of $Ar_3$ temperature or higher; and then subjecting the resulting steel material to accelerated cooling from a temperature of $(Ar_3-50)$ to $(Ar_3+30)°$ C. to a cooling stop temperature of 500 to 650° C. at a cooling rate of 5° C./s or more. The temperature is the temperature at a central portion of the steel material. The $Ar_3$ temperature is calculated from the following formula.

$$Ar_3(° C.)=910-310C-80Mn-20Cu-15Cr-55Ni-80Mo$$

In the above formula, each atomic symbol represents the content (mass %) of the element and is 0 when the element is not contained.

Next, a description will be given of the reasons for the limitations on the conditions of manufacturing.

Heating temperature: 1,000 to 1,300° C.

If the heating temperature is lower than 1,000° C., the dissolution of carbides is insufficient, so that the required strength is not obtained. If the heating temperature exceeds 1,300° C., the toughness of the base material deteriorates. Therefore, the heating temperature is specified to be 1,000 to 1,300° C.

Finish Rolling Temperature: $Ar_3$ Temperature or Higher

If the finish rolling temperature is lower than the $Ar_3$ temperature, the rate of ferrite transformation after the rolling is reduced, and plastic strain caused by the rolling remains in the ferrite. In this case, the strength of the ferrite becomes high, and the difference in hardness between the ferrite and bainite becomes low, so that the desired yield ratio cannot be achieved. Therefore, the finish rolling temperature is specified to be equal to or higher than the $Ar_3$ temperature. Preferably, a cumulative rolling reduction ratio in a temperature range of 900° C. or lower is 50% or more. When the cumulative rolling reduction ratio in the temperature range of 900° C. or lower is 50% or more, the size of austenite grains can be reduced.

Cooling Start Temperature in Accelerated Cooling: $(Ar_3-50)$ to $(Ar_3+30)°$ C.

If the cooling start temperature is lower than $(Ar_3-50)°$ C., the area fraction of the ferrite increases, and the strength of the base material is reduced. In addition, the difference in hardness between the ferrite and bainite becomes large, and the HIC resistance deteriorates. Therefore, the cooling start temperature is $(Ar_3-50)°$ C. or higher and preferably $(Ar_3-30)°$ C. or higher. If the cooling start temperature exceeds $(Ar_3+30)°$ C., the area fraction of the ferrite decreases and is insufficient for achieving a low yield ratio. Therefore, the cooling start temperature is $(Ar_3+30)°$ C. or lower and preferably $(Ar_3+25)°$ C. or lower.

Cooling Rate in Accelerated Cooling: 5° C./s or More

If the cooling rate is less than 5° C./s, pearlite is formed during cooling, so that sufficient strength and a sufficiently low yield ratio are not obtained. Therefore, the cooling rate is specified to be 5° C./s or more. The cooling rate is preferably 8° C./s or more and more preferably 10° C./s or more. The cooling rate is preferably 100° C./s or less and more preferably 60° C./s or less.

Cooling Stop Temperature: 500 to 650° C.

In the present disclosure, the cooling stop temperature in the accelerated cooling is an important manufacturing condition. If the cooling stop temperature is lower than 500° C., the number of dislocations generated by the transformation is large, and the amount of solute C is large. In this case, the yield ratio after the strain aging treatment becomes high, and a low yield ratio cannot be achieved. If the cooling stop temperature is higher than 650° C., the bainite softens, and the difference in hardness between the ferrite and the bainite becomes less than 70 HV, and a low yield ratio cannot be achieved. Therefore, the cooling stop temperature in the accelerated cooling is specified to be 500 to 650° C. The cooling stop temperature is preferably 515° C. or higher and more preferably 530° C. or higher. The cooling stop temperature is preferably 635° C. or lower and more preferably 620° C. or lower.

Through the manufacturing process described above, a steel material for highly deformable line pipes can be obtained, which exhibits superior strain aging resistance and HIC resistance and has a uniform elongation of 9% or more and a yield ratio of 90% or less both before and after the strain aging treatment at a temperature of 300° C. or lower. In the present disclosure, even after the steel material is subjected to a thermal history in a temperature range of 300° C. or lower in a general coating process for steel pipes, an increase in yield ratio and a reduction in uniform elongation that are caused by strain aging can be suppressed, and a uniform elongation of 9% or more and a yield ratio of 90% or less can be ensured. A strain age hardening phenomenon occurs during the heat treatment in the coating treatment. Therefore, by achieving a low yield ratio both before the strain aging treatment and after the strain aging treatment, a low yield ratio can be achieved even when the coating treatment is performed during manufacturing of a welded steel pipe.

5. Method for Manufacturing Welded Steel Pipe

A method for manufacturing a welded steel pipe will next be described.

In the disclosed embodiments, the above-descried steel material is used to form a steel pipe. In one method for forming a steel pipe, the steel material is formed into a steel pipe shape through cold forming such as a UOE process or press bending (referred to also as bending press).

In the UOE process, lateral edges of a steel plate used as a raw material are beveled and then crimped using a press machine. Then the steel plate is formed into a U shape and then into an O shape using a press machine. In this manner, the steel plate is formed into a cylindrical shape with the lateral edges of the steel plate facing each other. Then the lateral edges of the steel plate are brought into abutment and welded. This welding is referred to as seam welding. Preferably, the seam welding is performed using a method including two steps, i.e.: a tack welding step of holding the steel plate having the cylindrical shape, bringing the facing lateral edges of the steel plate into abutment, and performing tack welding; and a final welding step of subjecting the inner and outer surfaces of the seam of the steel plate to welding using a submerged arc welding method. After the seam welding, pipe expansion is performed in order to remove welding residual stress and to improve the roundness of the steel pipe. In the pipe expansion step performed, the pipe expansion ratio (the ratio of a change in outer diameter of the pipe before and after the pipe expansion to the outer diameter of the pipe before the pipe expansion) is usually 0.3% to 1.5%. From the viewpoint of the balance between the roundness improvement effect and the required ability of the pipe expansion machine, the pipe expansion ratio is preferably within the range of 0.5% to 1.2%. Subsequently, coating treatment may be performed for the purpose of corrosion protection. In the coating treatment, the outer surface may be heated to a temperature range of, for example, 200 to 300° C. and then coated with a known resin.

In the press bending, a steel plate is repeatedly subjected to three-point bending to gradually change its shape to thereby manufacture a steel pipe having a substantially circular cross section. Then seam welding is performed, as in the UOE process described above. Also in the press bending, pipe expansion may be performed after the seam welding, and a coating may also be formed.

EXAMPLE 1

Steel (one of steel types A to K) having a chemical composition shown in Table 1 (the balance being Fe and inevitable impurities) was used to manufacture a steel material having a plate thickness of 30 mm or 33 mm under conditions shown in Table 2. The temperature of a central portion of the steel material was used as temperatures such as the heating temperature, finish rolling temperature, and cooling stop (finish) temperature. The temperature of the central portion was measured directly by inserting a thermocouple into the central portion of a slab or the steel material or was calculated from the surface temperature of the slab or the steel material using parameters such as the plate thickness and the thermal conductivity. The cooling rate is the average cooling rate calculated by dividing the temperature difference required for cooling to the cooling stop (finish) temperature after completion of the hot rolling by the time required for the cooling.

TABLE 1

| Steel type | Chemical composition (mass %) | | | | | | | | | | | | | | | | Ar₃ temperature (° C.) | Remarks |
|---|---|---|---|---|---|---|---|---|---|---|---|---|---|---|---|---|---|---|
| | C | Si | Mn | P | S | Cu | Mo | Nb | Ti | Al | N | Ni | Cr | V | Ca | B | | |
| A | 0.053 | 0.12 | 2.0 | 0.008 | 0.001 | 0.25 | — | 0.04 | 0.010 | 0.03 | 0.003 | — | — | — | — | — | 729 | Within the |
| B | 0.076 | 0.10 | 1.8 | 0.005 | 0.001 | 0.28 | — | 0.02 | 0.010 | 0.03 | 0.004 | 0.28 | — | — | 0.0027 | — | 721 | scope of |
| C | 0.076 | 0.10 | 1.5 | 0.006 | 0.001 | 0.30 | — | 0.02 | 0.010 | 0.03 | 0.003 | 0.22 | 0.21 | — | 0.0023 | — | 745 | the present |
| D | 0.065 | 0.11 | 1.8 | 0.006 | 0.001 | 0.21 | — | 0.02 | 0.011 | 0.05 | 0.003 | 0.22 | 0.30 | — | 0.0031 | — | 725 | disclosure |
| E | 0.085 | 0.06 | 1.6 | 0.008 | 0.001 | 0.30 | — | 0.03 | 0.013 | 0.03 | 0.004 | 0.30 | 0.05 | 0.04 | 0.0025 | 0.0010 | 732 | |
| F | 0.083 | 0.31 | 0.8 | 0.009 | 0.002 | 0.43 | 0.01 | 0.03 | 0.012 | 0.03 | 0.004 | 0.45 | — | — | — | — | 786 | |
| G | 0.071 | 0.16 | 1.8 | 0.005 | 0.001 | 0.28 | 0.07 | 0.02 | 0.013 | 0.03 | 0.003 | 0.27 | — | — | 0.0015 | — | 718 | |
| H | 0.023 | 0.38 | 2.2 | 0.008 | 0.002 | 0.20 | — | 0.03 | 0.010 | 0.03 | 0.005 | 0.22 | — | 0.04 | — | — | 711 | Outside the |
| I | 0.094 | 0.34 | 0.4 | 0.009 | 0.001 | 0.51 | — | 0.03 | 0.012 | 0.04 | 0.004 | 0.46 | — | — | — | — | 813 | scope of |
| J | 0.085 | 0.24 | 2.1 | 0.012 | 0.002 | 0.07 | — | 0.03 | 0.011 | 0.03 | 0.004 | 0.30 | — | — | — | — | 698 | the present |
| K | 0.124 | 0.22 | 1.7 | 0.008 | 0.001 | 0.21 | — | 0.04 | 0.010 | 0.03 | 0.004 | 0.21 | — | — | — | 0.0007 | 720 | disclosure |

*Underlined items are outside the scope of the present disclosure.

TABLE 2

| No. | Steel type | Plate thickness (mm) | Heating temperature (° C.) | Finish rolling temperature (° C.) | Cooling start temperature (° C.) | Cooling rate (° C./s) | Cooling stop temperature (° C.) | Remarks |
|---|---|---|---|---|---|---|---|---|
| 1 | A | 33 | 1100 | 820 | 750 | 20 | 590 | Within the |
| 2 | B | 30 | 1050 | 760 | 730 | 20 | 570 | scope of |
| 3 | B | 30 | 1200 | 725 | 685 | 35 | 580 | the present |
| 4 | C | 30 | 1020 | 750 | 730 | 25 | 530 | disclosure |
| 5 | D | 30 | 1100 | 760 | 740 | 20 | 610 | |
| 6 | E | 33 | 1120 | 830 | 710 | 30 | 540 | |
| 7 | F | 30 | 1100 | 820 | 768 | 40 | 550 | |
| 8 | B | 30 | 1100 | 820 | 750 | 20 | 410 | Outside the |
| 9 | B | 30 | 1050 | 810 | 730 | 25 | 680 | scope of |
| 10 | B | 30 | 1100 | 790 | 760 | 25 | 570 | the present |
| 11 | D | 30 | 1100 | 790 | 750 | 3 | 580 | disclosure |
| 12 | G | 33 | 1150 | 780 | 730 | 25 | 560 | |
| 13 | H | 30 | 1180 | 750 | 720 | 40 | 530 | |
| 14 | I | 30 | 1200 | 850 | 830 | 35 | 530 | |
| 15 | J | 30 | 1150 | 740 | 645 | 40 | 510 | |
| 16 | K | 30 | 1180 | 780 | 730 | 35 | 540 | |

*Underlined items are outside the scope of the present disclosure.

For each of the steel materials manufactured as described above, structure observation was performed, and the tensile properties, the difference in hardness, and the HIC resistance were evaluated. The methods for evaluation are as follows.

(1) Structure Observation

A test piece for the structure observation was taken from one of the steel plates obtained, and an L direction cross section was polished and etched with nital. Microstructures of at least three regions in a central portion in a thickness direction, i.e., a portion ±2 mm from the center position in the thickness direction, were observed under an optical microscope (magnification: 400×) or a scanning electron microscope (magnification: 2,000×). The images of the microstructures were taken and subjected to image analysis to determine the type of the structure and the area fraction of each phase.

(2) Tensile Properties

To evaluate the tensile properties before strain aging treatment, two No. 4 test pieces specified in JIS Z 2201 were taken in a direction perpendicular to the rolling direction and subjected to a tensile test, and the average of the test values was used for evaluation. The strength required in the present disclosure is a tensile strength of 517 MPa or more (API 5L X60 or more). To evaluate the yield ratio and uniform elongation, two No. 4 test pieces specified in JIS Z 2201 were taken in the rolling direction and subjected to a tensile test, and the averages of the test values were used for evaluation. The yield ratio required in the present disclosure is a yield ratio of 90% or less, and the uniform elongation is 9% or more.

To evaluate the tensile properties after strain aging treatment, two No. 4 test pieces specified in JIS Z 2201 were taken in the rolling direction, subjected to a tensile strain of 2.0%, and then held at 250° C. for 5 minutes to perform strain aging treatment. Then a tensile test was performed, and the tensile strength was evaluated using the average of the test values. The evaluation criteria after the strain aging treatment are the same as the above-described evaluation criteria before the strain aging treatment.

(3) Difference in Hardness

A test piece for hardness measurement was taken from one of the steel plates obtained. The hardness of the ferrite and the hardness of the bainite were measured using a Vickers hardness tester with a measurement load of 5 g, and averages of at least 10 measurements were used to determine the difference in hardness between the ferrite and bainite. For No. 10 in Table 3, the test was not performed because no ferrite was contained.

(4) HIC Resistance

An HIC test was performed under the following conditions: immersion for 96 hours in a 1 mol/L acetic acid + sodium acetate buffer solution completely saturated with hydrogen sulfide, having a pH of about 5.0, and containing 5% NaCl. When no cracking was found, the HIC resistance was judged as good and represented by "Good." When cracking was found, a "Poor" rating was assigned.

The measurement results are shown in Table 3.

TABLE 3

| No. | Steel type | Metallographic structure Total area fraction of ferrite and bainite (%) | Remainder | Difference in hardness between ferrite and bainite (HV) | Before strain aging treatment | | | After strain aging treatment | | | HIC resistance | Remarks |
|---|---|---|---|---|---|---|---|---|---|---|---|---|
| | | | | | Tensile strength (MPa) | Yield ratio (%) | Uniform elongation (%) | Tensile strength (MPa) | Yield ratio (%) | Uniform elongation (%) | | |
| 1 | A | 100 | — | 75 | 574 | 87 | 15 | 582 | 89 | 10 | Good | Inventive |
| 2 | B | 98 | P | 78 | 545 | 88 | 18 | 551 | 88 | 13 | Good | Examples |
| 3 | B | 97 | P | 162 | 544 | 83 | 15 | 547 | 89 | 14 | Good | |
| 4 | C | 99 | P | 113 | 540 | 84 | 17 | 542 | 85 | 12 | Good | |
| 5 | O | 99 | P | 85 | 632 | 86 | 13 | 623 | 86 | 10 | Good | |
| 6 | E | 99 | P | 95 | 605 | 85 | 14 | 603 | 87 | 10 | Good | |
| 7 | F | 100 | — | 82 | 540 | 88 | 15 | 542 | 90 | 13 | Good | |
| 8 | B | 98 | P | 138 | 627 | 68 | 12 | 631 | 91 | 11 | Good | Comparative |
| 9 | B | 99 | P | 50 | 529 | 91 | 13 | 532 | 91 | 11 | Good | Examples |
| 10 | B | 99 (only bainite) | P | — | 590 | 91 | 12 | 532 | 92 | 11 | Good | |
| 11 | D | 85 | P | 69 | 531 | 91 | 8 | 535 | 92 | 8 | Good | |
| 12 | G | 97 | P | 79 | 613 | 75 | 16 | 608 | 82 | 12 | Poor | |
| 13 | H | 100 | — | 55 | 591 | 90 | 8 | 590 | 91 | 7 | Good | |
| 14 | I | 100 | — | 65 | 495 | 92 | 15 | 497 | 93 | 14 | Good | |
| 15 | J | 99 | P | 189 | 614 | 83 | 16 | 618 | 90 | 14 | Poor | |
| 16 | K | 91 | P, MA | 85 | 641 | 76 | 9 | 630 | 91 | 7 | Good | |

*Underlined items are outside the scope of the present disclosure.
P: Perlite,
MA: Martensite-austenite constituent As shown in Table 3, in each of Nos. 1 to 7, which are Inventive Examples, the chemical composition and the manufacturing method were within the scope of the present disclosure. Both before and after the strain aging treatment at 250° C. for 5 minutes after the application of a tensile strain of 2.0%, a high tensile strength of 517 MPa or more, a yield ratio of 90% or less, and a uniform elongation of 9% or more were obtained, and a low yield ratio, a high uniform elongation, and superior HIC resistance were achieved.

Each steel material had a metallographic structure composed mainly of ferrite and bainite, and the difference in hardness between the ferrite and the bainite was 70 or more in terms of Vickers hardness.

In Nos. 8 to 11, which are Comparative Examples, although the chemical composition was within the scope of the present disclosure, the manufacturing method was outside the scope of the present disclosure. Therefore, any of the metallographic structure, the strength, the yield ratio before the strain aging treatment, the yield ratio after the strain aging treatment, and the uniform elongation were insufficient. In Nos. 12 to 16, the chemical composition was outside the scope of the present disclosure, and the manufacturing method was outside the scope of the present disclosure in some cases. Therefore, the strength obtained was insufficient, the yield ratio was high, the uniform elongation was low, or cracking occurred in the HIC test.

The invention claimed is:

1. A steel material for highly deformable line pipes that has superior strain aging resistance and superior HIC resistance, the steel material having a chemical composition comprising:
   C: 0.030 to 0.100%, by mass %;
   Si: 0.01 to 0.50%, by mass %;
   Mn: 0.5 to 2.5%, by mass %;
   P: 0.015% or less, by mass %;
   S: 0.002% or less, by mass %;
   Cu: 0.20 to 1.00%, by mass %;
   Mo: 0.01% or less, by mass %;
   Nb: 0.005 to 0.05%, by mass %;
   Ti: 0.005 to 0.040%, by mass %;
   Al: 0.10% or less, by mass %; and
   N: 0.004% or less, by mass %,
   with the balance being Fe and inevitable impurities,
   wherein the steel material has a metallographic structure composed mainly of ferrite and bainite, and a remainder composed of at least one selected from the group consisting of martensite, pearlite, martensite-austenite constituent, and retained austenite, a total area fraction of the ferrite and the bainite is 90% or more, a total area fraction of the remainder is 10% or less, a difference in hardness between the ferrite and the bainite is 70 or more in terms of Vickers hardness, and
   the steel material has a uniform elongation of 9% or more and a yield ratio of 90% or less both (i) before a strain aging treatment at a temperature of 300° C. or lower and (ii) after the strain aging treatment.

2. The steel material for highly deformable line pipes that has superior strain aging resistance and superior HIC resistance according to claim 1, wherein the chemical composition further comprises at least one of:
   Ni: 0.02 to 0.50%, by mass %;
   Cr: 1.00% or less, by mass %;
   V: 0.10% or less, by mass %;
   Ca: 0.0050% or less, by mass %; and
   B: 0.0050% or less, by mass %.

3. A method for manufacturing a steel material for highly deformable line pipes that has superior strain aging resistance and superior HIC resistance, the method comprising:
   heating steel to a temperature of 1,000 to 1,300° C.,
   the steel having a chemical composition including:
      C: 0.030 to 0.100%, by mass %,
      Si: 0.01 to 0.50%, by mass %,
      Mn: 0.5 to 2.5%, by mass %,
      P: 0.015% or less, by mass %,
      S: 0.002% or less, by mass %, Cu: 0.20 to 1.00%, by mass %,
Mo: 0.01% or less, by mass %,
Nb: 0.005 to 0.05%, by mass %,
Ti: 0.005 to 0.040%, by mass %,
Al: 0.10% or less, by mass %, and
N: 0.004% or less, by mass %,
with the balance being Fe and inevitable impurities,
subjecting the heated steel to hot rolling at a finish rolling temperature equal to or higher than $Ar_3$ temperature; and
then, after hot rolling the steel, subjecting the steel to accelerated cooling from a temperature of $(Ar_3-50)$ to $(Ar_3+30)°$ C. to a cooling stop temperature of 500 to 650° C. at a cooling rate of 5° C./s or more;
wherein the steel material has a metallographic structure composed mainly of ferrite and bainite, and a remainder composed of at least one selected from the group consisting of martensite, pearlite, martensite-austenite constituent, and retained austenite, a total area fraction of the ferrite and the bainite is 90% or more, a total area fraction of the remainder is 10% or less, a difference in hardness between the ferrite and the bainite is 70 or more in terms of Vickers hardness, and the steel material has a uniform elongation of 9% or more and a yield ratio of 90% or less both (i) before a strain aging treatment at a temperature of 300° C. or lower and (ii) after the strain aging treatment.

4. A welded steel pipe produced using, as a raw material, the steel material for highly deformable line pipes that has superior strain aging resistance and superior HIC resistance according to claim 1.

5. A welded steel pipe produced using, as a raw material, the steel material for highly deformable line pipes that has superior strain aging resistance and superior HIC resistance according to claim 2.

6. The method according to claim 3, wherein the chemical composition further comprises at least one of:
Ni: 0.02 to 0.50%, by mass %;
Cr: 1.00% or less, by mass %;
V: 0.10% or less, by mass %;
Ca: 0.0050% or less, by mass %; and
B: 0.0050% or less, by mass %.

* * * * *